D. A. RAGGIO.
APPARATUS FOR INTERCITY EXCHANGE.
APPLICATION FILED DEC. 24, 1915.

1,332,411.

Patented Mar. 2, 1920.

Witnesses

Inventor
Dante A. Raggio

UNITED STATES PATENT OFFICE.

DANTE A. RAGGIO, OF CHICAGO, ILLINOIS.

APPARATUS FOR INTERCITY EXCHANGE.

1,332,411.      Specification of Letters Patent.      Patented Mar. 2, 1920.

Application filed December 24, 1915. Serial No. 68,520.

*To all whom it may concern:*

Be it known that I, DANTE A. RAGGIO, a citizen of the United States, residing at Chicago, in the county of Cook and State of Illinois, have invented certain new and useful Improvements in Apparatus for Intercity Exchanges, of which the following is the specification.

This invention relates to a device and method for intercity exchange and particularly to a means and method of application of said means whereby the equivalent of merchandise may be sent from city to city with no possibility of the diversion of the money spent to other purposes than those for which it was intended.

It is an object of the invention to provide a means or method whereby a person in one city may send to a person in another city, a merchandise order, upon the presentation of which at a definitely designated store, the recipient of the order may receive merchandise only to the amount specified in the order without the possibility of a diversion of the money spent to some other purpose and without sending cash.

In the drawings:

Figure 1 is a face view of a certificate of said intercity exchange made according to my invention.

Fig. 2 is a view of the check system showing a method of punching to indicate a certain amount.

Fig. 3 is a view of the check system showing a method of indicating other amounts.

Fig. 4 is a view of a portion of the reverse face of the certificate.

According to my invention, an association is formed comprising one or more stores in each of a number of cities. Each of these stores may thereafter issue certificates of inter-city exchange, or merchandise orders upon any member of the association. A person, therefore, desirous of supplying a person in other locality with merchandise can purchase at the association store in his city, a certificate of inter-city exchange properly drawn, stamped and filled out, and mail this certificate to the intended beneficiary. The beneficiary, or recipient of the order must then present the order to the store indicated thereupon, receiving therefor, merchandise in exchange and nothing else. Needless to say, such a system is of great utility for sending Christmas gifts, wedding gifts, necessary articles for children away at school, etc., where the giver is desirous that the recipient select the article he most desires where the sending of money would be objectionable as indelicate or because the money might be diverted to another use. From the standpoint of the purchasing public, this system and device would be of great benefit and utility. From the standpoint of the store involved in the system, the device is also of great benefit because every certificate sent represents the purchase at a single store in some city of merchandise to the amount of the certificate.

An adjustment of accounts between the various stores forming the association is a simple matter. The certificates could go through a clearing house or could be cashed directly, each store drawing upon its respective associates for the amount of the merchandise orders issued by them and taken up by it.

I have shown in the drawings, a device adapted for the application of the system described. It consists, essentially, of a slip of paper, preferably screened in removable ink, as in checks and the like, and divided into two pieces, 1 and 2 by a line of perforations or the like 3. The part 2 comprises a merchandise order or certificate of inter-city exchange and is suitably marked as indicated. In the particular certificate illustrated, 4 represents a space at the upper left hand corner of the certificate prepared for the designation of the amount, this amount being again designated, preferably by an indelible check-marking machine, as indicated at 5. The name of the city in which the store issuing the certificate is located is given in the upper right hand corner as indicated at 6 and the name of this store given as indicated at 7. The certificates issued by one store should be serially numbered as indicated at 9 and the number of the associate upon whom the certificate is drawn should also appear as indicated at 10. The name of the recipient or payee is written in as indicated at 11 and the name of the store upon whom the certificate is drawn indicated as at 12 with its associate number as shown at 13. The name of the purchaser should also appear as indicated at 14' and the signature and number of the official making out the certificate should appear as indicated at 14 as well as the cashier's stamp indicated at 15.

Inasmuch as these certificates must be payable without delays or verification in cities remote from that of their origin, it is essential that adequate means be provided to prevent their being raised or tampered with. Such means I now describe: A portion of part 2 of the slip at the extreme left thereof, is provided with a table of check numbers, comprising a column of numbers running from 0 through 10 and to 0 again at the extreme left and at the right as indicated at 16, and the square table of numbers running to 10 between, as shown at 17. To the right of the right hand column 16 is a column to indicate cents as indicated at 18 and at the bottom an indication of $100 as shown at 19. The part 1 of the slip, to the left of the dividing line 3 contains upon its front face, a brief extract of the merchandise ordered, indicated thereon. Upon its rear face it contains a replica 16′ 17′ 18′ and 19′ (Fig. 4) corresponding in all respects to the indication 16 17 18 and 19. After a certificate of inter-city exchange has been made out and properly signed, and torn from a book if carried therein, it is folded upon the perforated line 3 which brings the two check number systems together so that they match throughout. A punch is then applied so as to indicate the number of dollars and cents for which the certificate was issued. This is preferably accomplished as follows: If the amount for which the certificate was issued is between one and ten dollars, the numbers on both sides of the amount in the left-hand column 16 are punched out, and the number itself punched out of the right hand column 16. Thus in Fig. 2 is shown the punching for a purchase of $7.00, where the 8 and 6 are punched out of the left-hand column 16, and the 7 punched out of the right hand column 16. Where two numbers are punched out of the first column 16 there must be no perforations upon the table of check numbers 17 and a corresponding number must be punched out of the right hand column 16. Any other numbers punched from the check number table 17 at once indicates fraud or mistake and prevents the acceptance of the order. Where the amount is $10.00 or over, the first figure thereof is punched out from the left-hand column 16, the entire amount punched out in the most conveniently legible form from the table 17 and the last number is punched out from the right hand column 16. Thus (see Fig. 3) an order for $96.00 would be punched out by punching out the 9 from the left hand column 16, the number 6 from the right hand column 16 and the numbers 9 and 6 in the most conveniently legible form from the body of the table, the 6 being preferably punched below the 9 to indicate that 96 and not 69 is the number required, although confusion in this respect is rendered absolutely impossible by punching out the 9 and 6 in the columns 16. Thus where only one figure is punched out of the left hand column 16, two more figures must be punched out of the body of the table 17, neither more nor less. Any departure from this requirement at once indicates fraud or mistake and prevents the acceptance of the order. Only one table is provided for "cents," no extra precaution being advisable here. The particular system of tables and columns shown will provide for any sum up to $99.75. To allow a certificate to be issued for $100 the indicator 19 is provided. If the star is punched, no other punch can appear in the check number system. After the certificate and coupon have been properly filled out and the amount punched as above described, the purchaser may tear off the coupon, retaining it as a receipt and memorandum, and mail the merchandise order to the desired party who can cash it in at the indicated store as above explained.

A carbon is preferably made of the order by the store issuing it and sent to the clearing house or to the store upon which the order is drawn as a check and memorandum of outstanding certificates. This method may, however, be dispensed with, the safeguards upon the merchandise certificate itself being ample. I have shown in the drawings, a portion of a stub A which may be divided from the portion 1 of the slip by perforated line as indicated at 20, this stub being retained in a book and containing a brief abstract similar to that upon the coupon 1 as a record to be kept by the store issuing the certificate.

I claim

1. A certificate of intercity exchange to be issued by a predetermined store in one city for the issuance by a predetermined store in another city without the sending of money of an indicated value of merchandise only, comprising a slip having thereon indicia indicating the name and location of the issuing store, a designated space for the name of the other store in another city, a designated space for the name of the beneficiary, a designated space for the indication of the value, a statement that the indicated sum must be paid in merchandise and selected from the stock of said other store, and designated spaces for proper counter-signature and authorization by the issuing store.

2. A certificate of intercity exchange, comprising a slip having thereon indicia indicating the name and location of the issuing store, a designated space for the name of another store in another city, a designated space for the name of the beneficiary, a designated space for the indication of value, a designated statement indicating that the sum must be paid to beneficiary in merchandise, a designated space for proper authorization of issue, and a detachable coupon containing an abstract of the negotiations involved in the use of the slip, and protecting devices to prevent tampering with the slip.

3. A certificate of intercity exchange comprising a slip bearing indicia indicating an order from one merchant to a merchant in another city to pay a stated beneficiary merchandise only to a stated value, and means to prevent tampering with said slip and comprising tabulated numbers so arranged that for amounts less than ten dollars the numbers on each side of the first figure of the amount will be punched in one column and the said first figure itself be punched from another column and the cents punched in still another column.

4. A certificate of intercity exchange comprising a slip bearing indicia indicating an order from one merchant to a merchant in another city to pay a stated beneficiary merchandise only to a stated value, and means to prevent tampering with said slip and comprising tabulated numbers so arranged that for amounts less than ten dollars the numbers on each side of the first figure of the amount will be punched in one column and the said first figure itself be punched from another column and the cents punched in still another column, and a detachable coupon bearing on one face an abstract of the negotiations on the slip, and on its opposite face a table similar to the first mentioned table but reversely arranged whereby said coupon may be folded back and the desired figures on both tables be simultaneously punched.

5. A certificate of intercity exchange comprising a slip bearing indicia indicating an order from one merchant to a merchant in another city to pay a stated beneficiary merchandise only to a stated value, and means to prevent tampering with said slip comprising a vertical column of numbers and a square table of numbers so arranged that for amounts less than ten dollars the numbers on each side of the first figure of the amount will be punched in said vertical column and no numbers punched from said square table, while for amounts greater than ten dollars, and less than one hundred dollars, the first figure of the amount will be punched from said vertical column and the first two figures from said square table.

In witness whereof, I hereunto subscribe my name to this specification in the presence of two witnesses.

DANTE A. RAGGIO.

Witnesses:
I. V. CURRAN,
MARION EPHGRAVE.